United States Patent
Matsumoto et al.

(10) Patent No.: US 6,932,352 B2
(45) Date of Patent: Aug. 23, 2005

(54) GASKET EMBEDDING AN ION SENSOR

(75) Inventors: Kenji Matsumoto, Okayama (JP); Eiji Tomita, Okayama (JP); Sadami Yoshiyama, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 10/704,375

(22) Filed: Nov. 10, 2003

(65) Prior Publication Data
US 2004/0150169 A1 Aug. 5, 2004

(30) Foreign Application Priority Data
Nov. 11, 2002 (JP) ........................................ 2002-327095

(51) Int. Cl.⁷ .............................................. F02F 11/00
(52) U.S. Cl. .......................... 277/591; 277/594; 277/317
(58) Field of Search ................................ 277/591–597, 277/317; 73/115, 116

(56) References Cited
U.S. PATENT DOCUMENTS
4,947,680 A * 8/1990 McDougal ................... 73/116
5,659,132 A * 8/1997 Novak et al. ................. 73/115
2002/0130468 A1 * 9/2002 Kawai et al. ................ 277/318

* cited by examiner

Primary Examiner—Enoch E Peavey
(74) Attorney, Agent, or Firm—Bacon & Thomas

(57) ABSTRACT

A gasket embedding an ion sensor 5 used for sealing a cylinder head to a cylinder block of an engine which is intervened under pressure between the cylinder head and the cylinder block, the gasket having a detection function of the condition in a combustion chamber. The gasket comprises a metal sheet in which a bore seal is formed at a ring-like bead structure and of an insulation seal layer coating at least the upper surface and the lower surface of the metal sheet so as to include the bead structure. An ionic current detection electrode is formed so as to project into the combustion chamber from the insulation seal layer and further a lug projecting outside from the periphery of the insulation seal layer is served as an ionic current introduction electrode of the sensor.

18 Claims, 5 Drawing Sheets

GASKET EMBEDDING AN ION SENSOR

FIELD OF THE INVENTION

The preset invention relates to a gasket intervened under pressure between the cylinder head and the cylinder block of an engine for gas sealing and more specifically to a gasket embedding an ion sensor for detecting the combustion condition in the combustion chamber of an engine.

PRIOR ART

There has been disclosed a gasket in which a liner or probe type detection body is insulated and embedded therein, and such gasket is used for gas sealing of an engine and directly detecting fire spreading in the combustion chamber in an automobile engine and the like. For example, JP-A-63-66431 and JP-A-4-308339 propose and disclose such a gasket.

This type gasket, namely an ion sensor embedding gasket is intervened under pressure between the cylinder head and the cylinder block for achieving inherent sealing function as a gasket. And it has a detection body of which chip end faces to the combustion chamber of an engine and is designed such that it detects the combustion condition in the combustion chamber by measuring change in current at the moment when fire having generated in the combustion chamber reaches at the chip end of the detection body, when voltage is applied to the detection body under the condition that the cylinder head or the cylinder block is grounded.

Such a detection body is embedded in the gasket intervened under pressure between the cylinder head and the cylinder block so that the installation position of the ion sensor isn't limited and the combustion condition at a desired area can be detected. Therefore, such a gasket is expected to be realized and utilized in the field of controlling automobile engine and so on in the future.

When such ion embedding gasket as mentioned above is intervened under pressure between the cylinder head and the cylinder block, it is required to keep the sealing function for gas around a cylinder bore by increasing the setting pressure against the upper and the lower surfaces of the gasket. However, when trying to increase the setting pressure of the gasket, there would cause crack and so on in the gasket (insulation seal layer), which contacts with a liner or probe type detection body which is embedded in the gasket, because of the thickness of the liner or probe type detection body, thereby causing a problem of not ensuring the sealing capability for the detection body.

Therefore, such a crack may be prevented by making the detection body as narrow or thin as possible. Such detection body of which tip end is made so narrow may be melted by the fire and an engine may be also destroyed by pre-ignition phenomena which is caused by the fact the tip end turns into an ignition source.

Gasket embedding an ion sensor (bore grommet type) in which liner or probe type detection body as mentioned above is used as an ion sensor also has such problem that its production cost is increased because the detection body is made as such part as to be optionally attached to a gasket.

SUMMARY OF THE INVENTION

The present invention has been proposed to solve the above-mentioned problems and its object is to provide an improved gasket embedding an ion sensor in which the above-mentioned crack and the like aren't caused and ignition on hot surface is prevented while keeping reliability against fire at the tip end at the combustion chamber side of the detection body.

According to the present invention, the gasket embedding an ion sensor used for sealing the cylinder head to the cylinder block of an engine, which is intervened under pressure between the cylinder head and the cylinder block. The gasket comprises a metal sheet provided with an opening corresponding to a cylinder bore of the engine, a lug projecting outside from the periphery of the metal sheet, and a bead structure annually formed around the opening; and an insulation seal layer for coating at least a part of an upper surface and a lower surface of the metal sheet around the bead structure. An ionic current detection electrode is provided at the opening of the metal sheet, the ionic current detection electrode projects into a combustion chamber of the edge of the opening in a manner that it comes out from between the insulation seal layer, and the lug functions as an ionic current introduction electrode.

When the gasket is intervened under pressure between the cylinder head and the cylinder block of the engine, a part of the metal sheet projects into the combustion chamber serving as the ionic current detection electrode to contact with a combustion gas, and further the lug projecting outside from the periphery of the metal sheet is served as the ionic current introduction electrode. When the cylinder head and/or the cylinder block are grounded and electric voltage (for example 90V) is applied between the ionic current introduction electrode and the ionic current detection electrode, a loop circuit of ionic current is formed via a fire area in an ionic condition at once every time fire is caused in the combustion chamber of the engine. Thus caused current change and detected current is amplified by an amplifier and is subjected to a signal process, thereby detecting the combustion condition in the combustion chamber as the current change.

According to the gasket embedding an ion sensor of the present invention, ionic current is detected relating to not only combustion in the gasoline engine but also combustion in the diesel engine, being applicable for any kind of internal combustion engine housing a gasket.

Further, the upper surface and the lower surface including the bead constructed member of the metal sheet are coated with the insulation seal layer so that the insulation capability of the metal sheet is kept not to cause electric leak. Moreover, according to the gasket of the present invention, the metal sheet is served as a core material and the restoring resilience accompanied with the elastic deformation caused by a compressed bead structure is acted on the opposing faces of the cylinder head and the cylinder block so that each bearing interposing the gasket is firmly kept when the cylinder head and the cylinder block are fastened while being held with the gasket. Therefore, unlike the gasket housing the liner or probe type detection body mentioned in the prior art, the insulation seal layer doesn't generate any clack during fastening procedure. The present invention provides a gasket with high added value which is superior in durability.

Further according to the present invention, the metal sheet is preferably made of ion sheet, stainless sheet, or a conductive metal sheet and its thickness is preferably 0.1 mm–0.3 mm. Still further according to the present invention, the insulation seal layer has a thickness of 0.05 mm–0.3 mm and is preferably made of any one of materials; inorganic fiber, organic fiber, inorganic filler material and rubber type binder or is made of a combination of the aforementioned material.

According to the gasket embedding an ion sensor as mentioned above, an insulation seal layer for cooling medium is further provided at a place corresponding to a cooling medium communicating bore and the insulation seal layer coats a part of the upper surface and the lower surface of the metal sheet for sealing an upper opening of the cooling medium communicating bore. Communicating bore of cooling medium (water, antifreeze liquid, oil and so on) is formed around the bore of the cylinder block and may be opened at the upper surface of the cylinder block. However, according to the gasket of the present invention, the insulation seal layer for cooling medium is formed at the upper surface and the lower surface of the metal sheet for sealing the opening so that the cooling medium is prevented from leaking out of the communication bore, thereby keeping its cooling function and also keeping insulation capability of the metal sheet.

According to the gasket embedding an ion sensor of the present invention, a cooling medium communicating bore is further provided at the cylinder block and the cylinder head for communicating the cooling medium therebetween respectively, a communicating opening through which both cooling medium communicating bores of the cylinder block and the cylinder head communicate is provided at a part of the metal sheet corresponding to the opening of the cooling medium communication bore, and an insulation seal layer for cooling medium coats a part of the upper surface and the lower surface of the metal sheet around the communication openings. In the present invention, a cooling medium communicating bore is also formed on the cylinder head so as to prevent leakage of cooling medium without damaging communication function of the cooling medium between both cooling medium communicating bores, thereby achieving the above-mentioned function.

According to the present invention, a ring-like projecting portion is preferably formed around the opening of the insulation seal layer for cooling medium and the projecting portion surrounds the opening of the insulation seal layer for cooling medium. By such constructed ring-like projecting portion, when the engine is fastened to be constructed while interposing the gasket, sealing is made secured by the restoring resilience caused by the compressed elastic deformation of the projecting portion, thereby improving leak prevention ability of cooling medium.

Further according to the gasket embedding an ion sensor of the present invention as mentioned above, the gasket constitutes plural individual gaskets used for an inline multi-cylinder engine and the metal sheet of individual gaskets is provided with an ionic current detection electrode at the opening formed corresponding to the cylinder bore of the engine, while the lug functionates as the ionic current introduction electrode. According to such a gasket embedding an ion sensor, cylinders can be insulated each other so that combustion signals per a cylinder are taken out individually.

Still further according to the gasket embedding an ion sensor of the present invention as mentioned above, the gasket constitutes a common gasket used for an inline multi-cylinder engine and the metal sheet of the common gasket is provided with an ionic current detection electrode at the opening formed corresponding to the cylinder bore of the engine, while the lug functionates as the ionic current introduction electrode.

According to this common gasket, cylinders aren't insulated individually, however, combustion timing of each cylinder which is caused in time series in one engine can be accurately detected. If an analysis process by means of a signal processing unit is combined, ignition control for the engine can be executed in a balanced manner, thereby achieving fuel-efficient control.

Further, a gasket applicable for plural cylinders is produced at one time so that production cost is remarkably reduced.

DETAILED DESCRIPTION OF THE PREFERRED EMBODIMENTS

Figure 1:
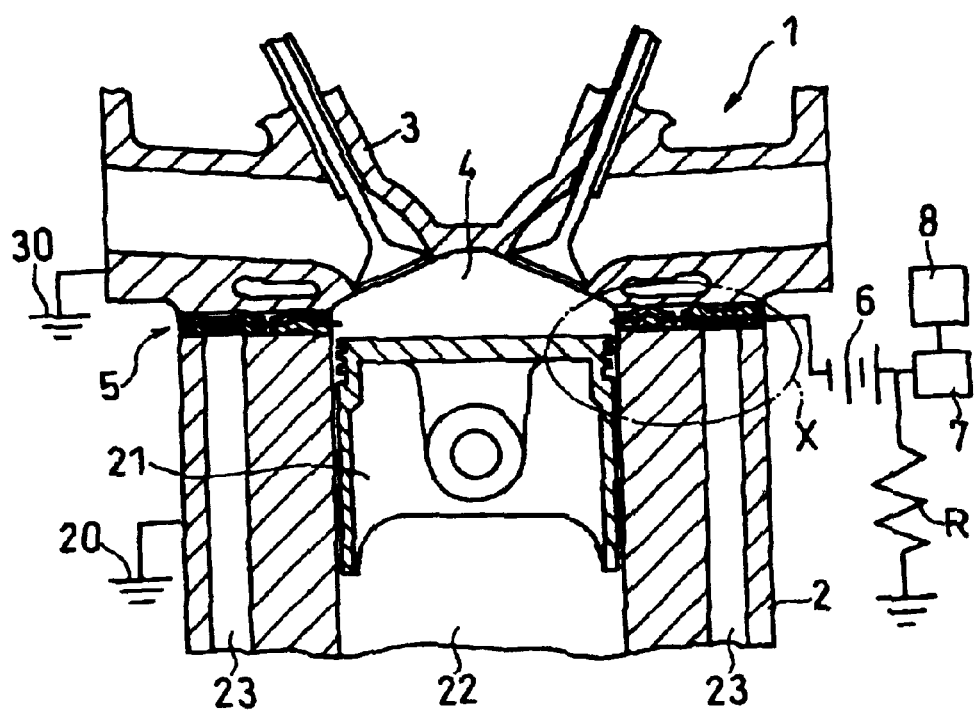
FIG. 1 is a vertical section showing an essential part of an automobile engine assembled with a gasket embedding an ion sensor according to the present invention.
Figure 2:
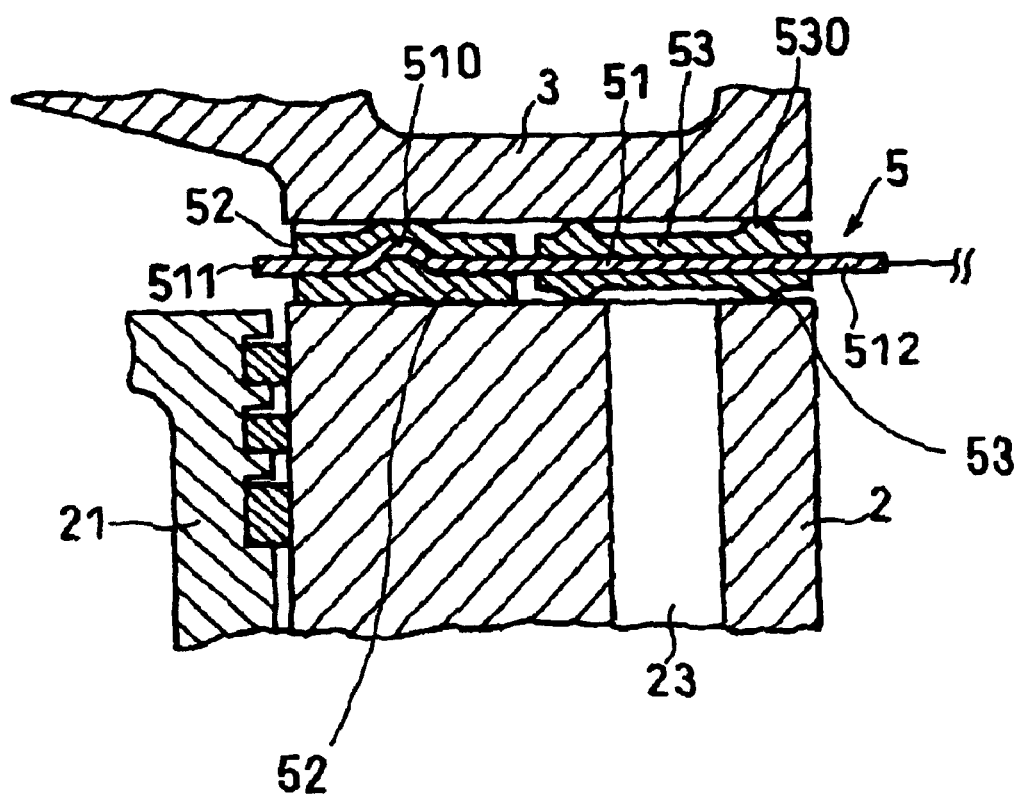
FIG. 2 is an enlarged view of the area "X" in FIG. 1.

Now, the preferred embodiments of the present invention are given referring to the attached drawings. FIG. 1 is a vertical section showing an essential part of an automobile engine composed with a gasket embedding an ion sensor according to the present invention. FIG. 2 is an enlarged view of the area "X" in FIG. 1. The reference numeral 1 shows an engine which is constructed such that a gasket embedding an ion sensor 5 is provided on a cylinder block 2 and a cylinder head 3 is held thereon to sandwich the gasket 5, thereby being fastened. The reference numeral 21 indicates a piston which reciprocates up and down in a cylinder bore 22 of the cylinder block 2 and the space formed with the upper end of the piston 21 and the lower end of the cylinder head 3 becomes a combustion chamber 4. The reference numeral 23 is a cooling medium communicating bore formed at the cylinder block 2 and water, antifreeze liquid, oil and so on are supplied to the communicating bore 23. The gasket embedding an ion sensor fully seals between the cylinder block 2 and the cylinder head 3 so as not to leak combustion gas out of the combustion chamber 4.

Conductive metal sheet 51 is used as a core material of the gasket embedding an ion sensor 5. The metal sheet 51 is constructed such that both of the upper surface and the lower surface of the metal sheet 51 around the cylinder bore 22 are coated with an insulation seal layer 52 and further those surfaces around the cooling medium communicating bore 23 are coated with an insulation seal layer for cooling medium 53. The insulation seal layer 52 and the insulation seal layer for cooling medium 53 are formed such that any one of inorganic fiber, organic fiber, inorganic filler and rubber type binder or a combination thereof is coated on the upper surface and the lower surface of the metal sheet 51. In the figure, the insulation seal layer 52 and the insulation seal layer for cooling medium 53 are formed individually, however, both of them may be formed integrally. If each one of them is formed respectively, a material being superior in heat resistance is used for the insulting seal layer 52 which is exposed to high-temperature combustion gas or a material being superior in water resistance, oil resistance and chemical resistance is used for the insulation seal layer for cooling medium 53, resulting in improving each aptitude.

Bead structure 510 which has waved peak and bottom is formed around the area surrounding the upper opening of the cylinder bore 22 on the metal sheet 51 and the insulation seal layer 52 is formed on the upper surface and the lower surface of the metal sheet 51 so as to include the bead structure 510. The bead structure 510 reinforces the metal sheet 51 because of its rib effect and further rigidly supports the bearing of the opposing surfaces of the gasket embedding an ion sensor 5 against the cylinder block 2 and the cylinder head 3 by the restoring elasticity caused by compressed elastic deformation when the engine 1 is fastened to be constructed, thereby improving the sealing capability. Ring-like projecting portion 530 is formed to be raised at the area surrounding the cooling medium communicating bore 23 on the insulation seal layer for cooing medium 53. The projecting portion 530 is compressed to be elastically deformed when the engine 1 is fasted and constructed and is disposed in abutment under pressure against each opposing face against the cylinder block 2 and the cylinder head 3 because of the restoring elasticity of the projecting portion 530, thereby assuring higher sealing function for the cooling medium.

Inner circumference 511 at the cylinder bore 22 side of the metal sheet 51 faces the combustion chamber 4 in a manner that a part of the metal sheet 51 is exposed from the insulation seal layer 52, thereby acting as an ionic current detection electrode. Such an ionic current detection electrode may be constructed such that the entire circumference of the inner circumference 511 is projected or its part is projected. The metal sheet 51 has a lug projecting outside from the periphery of the engine 1 and the lug serves as an ionic current introduction electrode 512. Therefore, an electric source 6, an amplifier 7 and a signal processing unit 8 are connected with the ionic current introduction electrode 512 as shown in FIG. 1 when the engine 1 is constructed. Further, the cylinder block 2 and the cylinder head 3 are grounded as shown with the numerals 20 and 30, however, only one of them may be grounded.

According to such construction, when 90V voltage is applied between the introduction electrode 512 and both of the cylinder block 2 and the cylinder head 3, both being an earth electrode, by mean of power source 6, ionic current generates to constitute current loop circuit through a fire area under ionic condition at the moment when fire is reached to the ionic current detection electrode 511 provided so as to face the combustion chamber 4. Then the change in the current value generated in a detection resistance "R" provided for the loop circuit is amplified by the amplifier 7 and is processed in the signal processing unit 8 so that combustion condition in the combustion chamber 4 is detected for analysis.

Therefore, according to the gasket of the present invention, the metal sheet 51 serves as a core material of the gasket embedding an ion sensor 5 and also serves as an ion sensor itself for the fire in the combustion chamber 4.

Figure 3:
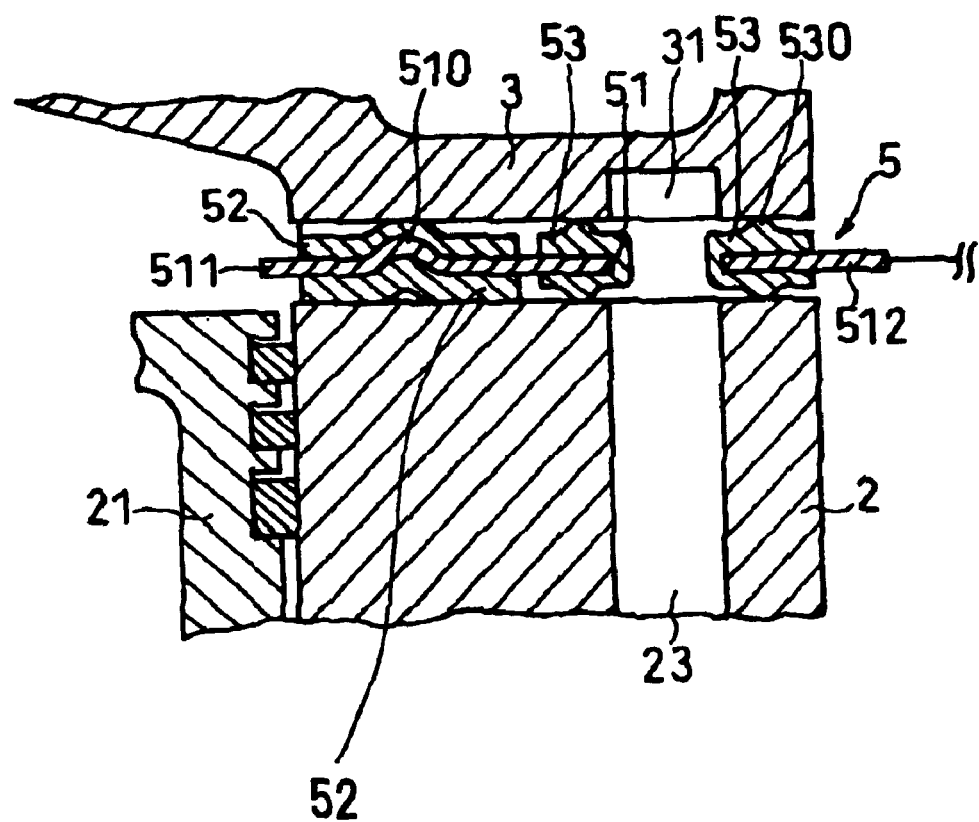
FIG. 3 is an enlarged view of the area "X" of the alternative embodiment.

According to the embodiment shown in FIG. 3, a cooling medium communicating bore 31 corresponding to the above-mentioned cooling medium communicating bore 23 is also provided for the cylinder head 3 such that the cooling medium is supplied between the both cooling medium communicating bores 23 and 31 so as to cool down the engine. The metal sheet 51 is provided with communication openings at the positions corresponding to the opening of the both cooling medium communicating bores 23 and 31 and the insulation seal layer for sealing medium 53 is formed to cover the upper surface and the lower surface around the communication openings as mentioned above. Ring-like projecting portion 530 is formed to be raised for the insulation seal layer for cooling medium 53 so as to surround the communication bores. Therefore, leak prevention function is achieved while keeping distribution of cooling medium between both cooling medium communicating bores 23 and 31, as mentioned above. Other constructions are the same as the embodiment mentioned hereinbefore, so that the same reference numerals are allotted for the common members and their explanations are omitted here.

Figure 4:
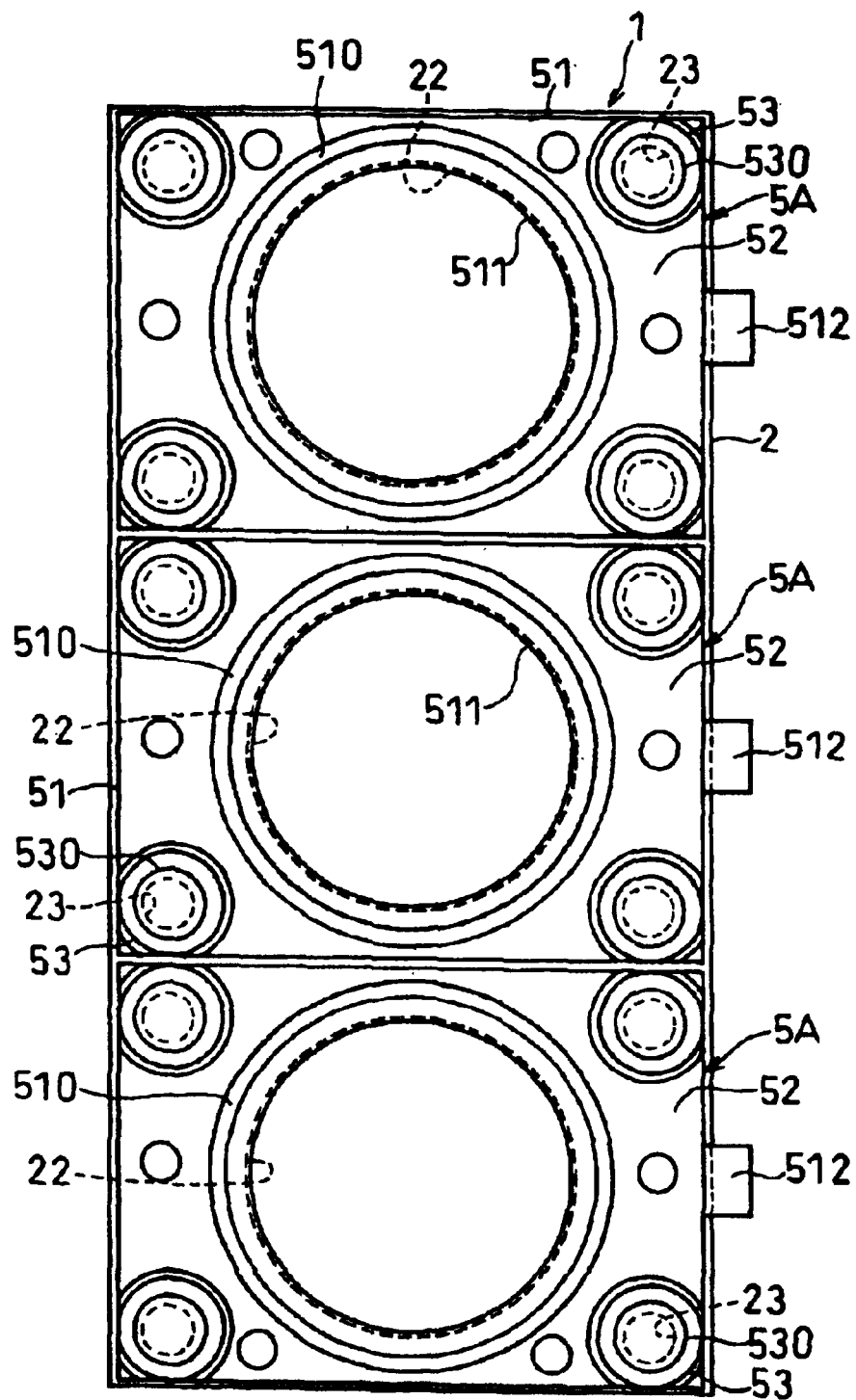
FIG. 4 is a plane view showing that a gasket embedding an ion sensor of the present invention is mounted for the inline multi-cylinder engine.
Figure 5:
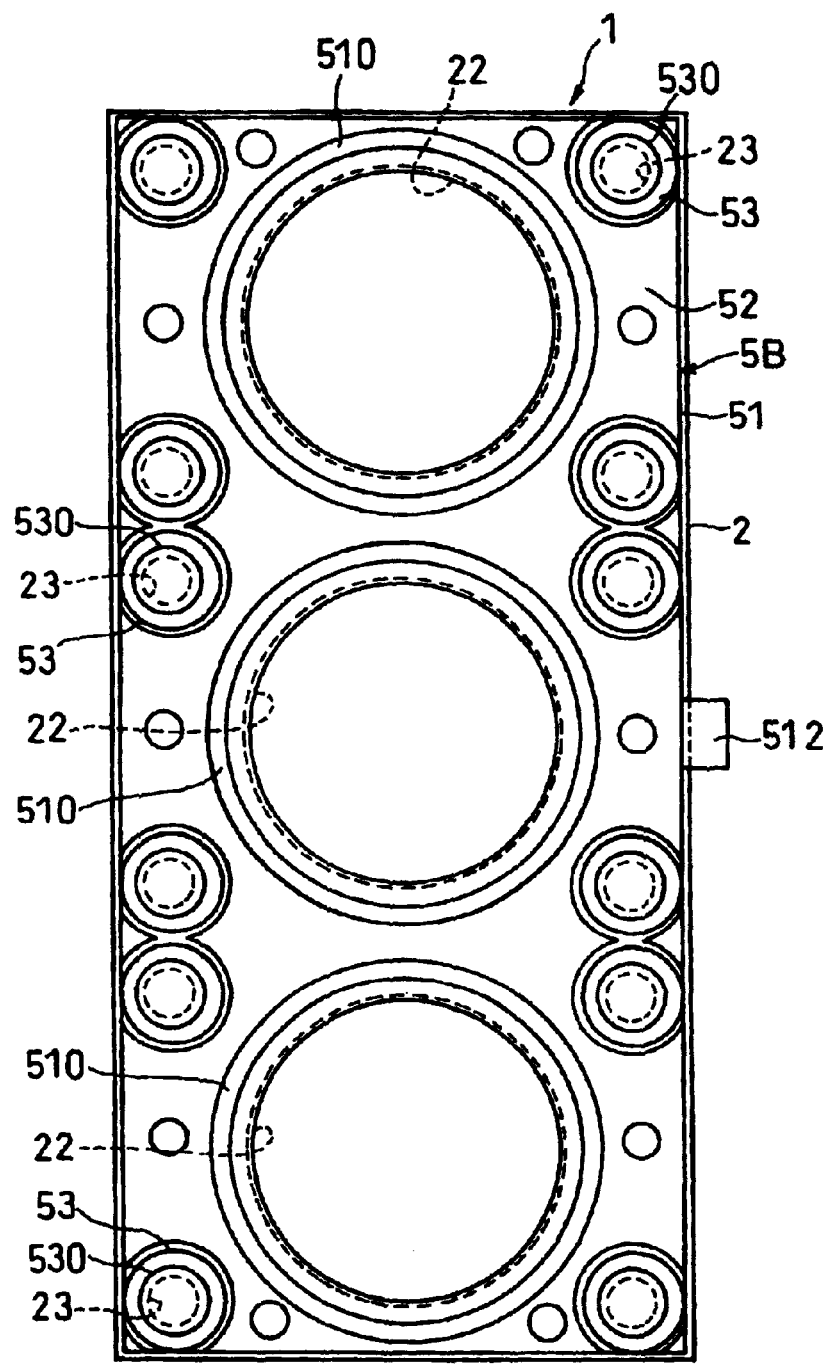
FIG. 5 is a plane view of the modified embodiment of a gasket according to the present invention.

FIG. 4 and FIG. 5 are plane views showing that the gasket embedding an ion sensor 5 is mounted for the inline multi-cylinder engine 1 (three cylinders in the figures). The figures show the cylinder head is removed for easy understanding. In FIG. 4 plural individual gaskets 5A are formed for each cylinder and in FIG. 5 one common gasket 5B is provided for three cylinders.

The gaskets 5A in FIG. 4 are independently separated each other, each ionic current introduction electrode 512 projected into the outer circumference of the cylinder block 2 is formed for the metal sheet 51 of each gasket 5A, and an electric source for detection and so on are connected to the introduction electrode 512 like FIG. 1. Ring-like bead structure 510 is formed at the area surrounding the cylinder bore 22 of each metal sheet 51 and the insulation seal layer 52 is coated at the upper surface and the lower surface of each metal sheet 51 so as to include the bead structure 510. Further, four cooling medium communicating bores 23 are provided around each cylinder bore 22 and the above-mentioned insulation seal layer for cooling medium 53 is coated on the upper surface and the lower surface of the metal sheet 51 corresponding to the cooling medium communicating bores 23. How the cooling medium communicating bore 23 is formed isn't limited to the embodiment shown in the figure and the number thereof may be changed if necessary.

FIG. 5 shows one common gasket 5B which is commonly used for three cylinders. As mentioned above, ring-like bead structure 510 is formed at the position surrounding each bore 22 of one metal sheet 51. One sheet of insulation seal layer 52 is coated at the upper surface and the lower surface of the metal sheet 51 so as to include these bead structures 510. One lug 512 projecting outside from the periphery of the cylinder block 2 is formed for the metal sheet 51, serving as an ionic current introduction electrode and being connected with the electric source for detection and so on. How the cooling medium communicating bore 23 is formed is the same as the embodiment shown in FIG. 4, so that the same reference numerals are allotted for the common members so as to eliminate their explanations.

According to the embodiment in FIG. 4, each cylinder is blanketed to be insulated with each gasket embedding an ion sensor 5A, resulting in taking out the combustion signal per each cylinder. According to the embodiment in FIG. 5, each cylinder is integrated with the gasket embedding an ion sensor 5B, however, combustion in the cylinder isn't generally occurred at the same time. Therefore, if combustion in each cylinder is analyzed in time series, combustion condition in each cylinder is detected. Preferably, the number of members required and the number of assembly process are reduced by integrating the cylinders, achieving the advantage of reducing the cost required for assembling and producing the engine.

EFFECT OF THE INVENTION

According to the gasket embedding an ion sensor of the present invention, an ion sensor is composed of the gasket, the cylinder block and/or the cylinder head so that assembly or attachment to the engine is simplified and facilitated the combustion condition in the combustion chamber is effectively detected.

Further, because the detection body is comprised of a metal sheet, insulation capability is kept in a good condition and the gasket is prevented from being cracked when the cylinder head is fastened, thereby improving reliability as an ion sensor as well as a gasket.

The metal sheet as an electrode of an ion sensor is served as a core material of the gasket and the bead structure is formed at a bore seal part (area surrounding the cylinder bore) of the metal sheet. Therefore, the gasket is reinforced by the rib effect of the bead structure and the bearing of the facing surfaces between the cylinder block and the cylinder head interposing the gasket is firmly kept because of the restoring elastic force caused by the elastic deformation of the bead member when the cylinder head is fastened, thereby keeping high sealing capability.

When the insulation seal layer for cooling medium is formed outside of the bead structure on the metal sheet so as to sealing the upper end opening of the cooling medium communicating bore formed on the cylinder block, leakage of medium from the cooling medium communicating bore is prevented and the insulation capability of the gasket is preferably kept.

Further, when the cooling medium communicating bore for distributing the cooling medium is formed in the cylinder block and the cylinder head respectively, a communication opening through which both cooling medium communicating bores of the cylinder block and the cylinder head communicate is formed in the metal sheet corresponding to those cooling medium communicating bores and the insulation seal layer for cooling medium is also formed at the upper surface and the lower surface of the communicating bore. In such a case, leakage of medium is prevented and insulation of the gasket is preferably kept while keeping distribution of the cooling medium between both cooling medium communicating bores.

Providing a ring-like projecting portion at the opening of the insulation seal layer for cooling medium so as to surround the opening, sealing capability is firmed by the restoring resilience caused by the compression elastic deformation of the projecting portion, thereby improving leak prevention ability of the cooling medium.

Gasket may be individually intervened under pressure between the cylinder head and the cylinder block of each one of the inline multi-cylinders connected for the engine or a common gasket may be integrally held between the cylinder heads and the cylinder blocks of plural inline multi-cylinders.

In the former case, combustion signal is taken out per each combustion chamber and in the latter case, the production cost is reduced.

What is claimed is:

1. A gasket embedding an ion sensor used for sealing a cylinder head to a cylinder block of an engine which is situated under pressure between the cylinder head and the cylinder block of the engine, said gasket comprising:
    a metal sheet provided with an opening corresponding to a cylinder bore of the engine, a lug projecting outside from the periphery of said metal sheet, and a bead structure annularly formed around said opening; and
    an insulation seal layer for coating at least a part of the upper surface and the lower surface of said metal sheet around said bead structure; wherein:
    an ionic current detection electrode is provided at said opening of said metal sheet, said ionic current detection electrode projecting into a combustion chamber of the engine from the edge of said opening in a manner that it comes out from said insulation seal layer;
    said lug functionates as an ionic current introduction electrode the opening edge of said metal sheet projects into said cylinder bore of said engine so as to constitute an ionic current detection electrode in a manner that said opening edge is barely exposed from said insulation seal layer; and
    said lug constitutes an ionic current introduction electrode.

2. The gasket embedding an ion sensor as set forth in claim 1, wherein:
    the thickness of said metal sheet is 0.1 mm–0.3 mm.

3. The gasket embedding an ion sensor as set forth in claim 1, wherein:
    said insulation seal layer has a thickness of 0.05 mm–0.3 mm; and
    said insulation seal layer is made of any one of materials; inorganic fiber, organic fiber, inorganic filler material and rubber type binder or is made of a combination of aforementioned materials.

4. The gasket embedding an ion sensor in claim 1, wherein:
    an insulation seal layer for cooling medium is further provided at a place corresponding to a cooling medium communicating bore formed at said cylinder block; and
    said insulation seal layer coats a part of the upper surface and the lower surface of said metal sheet for sealing an upper opening of said cooling medium communicating bore.

5. The gasket embedding an ion sensor in claim 2, wherein:
    an insulation seal layer for cooling medium is further provided at a place corresponding to a cooling medium communicating bore formed at said cylinder block; and
    said insulation seal layer coats a part of the upper surface and the lower surface of said metal sheet for sealing an upper opening of said cooling medium communicating bore.

6. The gasket embedding an ion sensor in claim 3, wherein:
    an insulation seal layer for cooling medium is further provided at a place corresponding to a cooling medium communicating bore formed at said cylinder block; and
    said insulation seal layer coats a part of the upper surface and the lower surface of said metal sheet for sealing an upper opening of said cooling medium communicating bore.

7. The gasket embedding an ion sensor as set forth in claim 1, wherein:
    a cooling medium communicating bore through which cooling medium freely moves is further provided at said cylinder block and said cylinder head;
    a communication opening through which both cooling medium communicating bores of said cylinder block and said cylinder head communicate is provided at a part of said metal sheet corresponding to said opening of said cooling medium communicating bore; and
    an insulating seal layer for cooling medium coats a part of the upper surface and the lower surface of said metal sheet around said communication opening.

8. The gasket embedding an ion sensor as set forth in claim 2, wherein:
    a cooling medium communicating bore through which cooling medium freely moves is further provided at said cylinder block and said cylinder head;

a communication opening through which both cooling medium communicating bores of said cylinder block and said cylinder head communicate is provided at a part of said metal sheet corresponding to said opening of said cooling medium communicating bore; and an insulating seal layer for cooling medium coats a part of the upper surface and the lower surface of said metal sheet around said communication opening.

9. The gasket embedding an ion sensor as set forth in claim 3, wherein:

a cooling medium communicating bore through which cooling medium freely moves is further provided at said cylinder block and said cylinder head;

a communication opening through which both cooling medium communicating bores of said cylinder block and said cylinder head communicate is provided at a part of said metal sheet corresponding to said opening of said cooling medium communicating bore; and an insulating seal layer for cooling medium coats a part of the upper surface and the lower surface of said metal sheet around said communication opening.

10. The gasket embedding an ion sensor as set forth in claim 1, wherein:

a ring-like projecting portion is formed around said opening of said insulation seal layer for cooling medium, said projecting portion surrounding said opening of said insulation sealing layer for cooling medium.

11. The gasket embedding an ion sensor as set forth in claim 2, wherein:

a ring-like projecting portion is formed around said opening of said insulation seal layer for cooling medium, said projecting portion surrounding said opening of said insulation sealing layer for cooling medium.

12. The gasket embedding an ion sensor as set forth in claim 3, wherein:

a ring-like projecting portion is formed around said opening of said insulation seal layer for cooling medium, said projecting portion surrounding said opening of said insulation sealing layer for cooling medium.

13. The gasket embedding an ion sensor as set forth in claim 1, wherein:

said gasket constitutes plural individual gaskets used for an inline multi-cylinder engine; and the metal sheet of individual gaskets is provided with an ionic current detection electrode at said opening formed corresponding to said cylinder bore of said engine, while said lug functionates as said ionic current introduction electrode.

14. The gasket embedding an ion sensor as set forth in claim 2, wherein:

said gasket constitutes plural individual gaskets used for an inline multi-cylinder engine; and the metal sheet of individual gaskets is provided with an ionic current detection electrode at said opening formed corresponding to said cylinder bore of said engine, while said lug functionates as said ionic current introduction electrode.

15. The gasket embedding an ion sensor as set forth in claim 3, wherein:

said gasket constitutes plural individual gaskets used for an inline multi-cylinder engine; and the metal sheet of individual gaskets is provided with an ionic current detection electrode at said opening formed corresponding to said cylinder bore of said engine, while said lug functionates as said ionic current introduction electrode.

16. The gasket embedding an ion sensor as set forth in claim 1, wherein:

said gasket constitutes a common gasket used for an inline multi-cylinder engine; and the metal sheet of the common gasket is provided with an ionic current detection electrode at said opening formed corresponding to said cylinder bore of said engine, while said lug functionates as said ionic current introduction electrode.

17. The gasket embedding an ion sensor as set forth in claim 2, wherein:

said gasket constitutes a common gasket used for an inline multi-cylinder engine; and the metal sheet of the common gasket is provided with an ionic current detection electrode at said opening formed corresponding to said cylinder bore of said engine, while said lug functionates as said ionic current introduction electrode.

18. The gasket embedding an ion sensor as set forth in claim 3, wherein:

said gasket constitutes a common gasket used for an inline multi-cylinder engine; and the metal sheet of the common gasket is provided with an ionic current detection electrode at said opening formed corresponding to said cylinder bore of said engine, while said lug functionates as said ionic current introduction electrode.

* * * * *